(12) United States Patent
Meritt

(10) Patent No.: US 9,554,555 B2
(45) Date of Patent: Jan. 31, 2017

(54) APPARATUS FOR PROTECTING FEED ACCUMULATED IN A WILDLIFE FEEDER

(71) Applicant: Rick Meritt Investments, Ltd., Gilmer, TX (US)

(72) Inventor: Rick Meritt, Gilmer, TX (US)

(73) Assignee: Rick Meritt, Gilmer, TX (US)

(*) Notice: Subject to any disclaimer, the term of this patent is extended or adjusted under 35 U.S.C. 154(b) by 36 days.

(21) Appl. No.: 14/747,889

(22) Filed: Jun. 23, 2015

(65) Prior Publication Data

US 2016/0029591 A1 Feb. 4, 2016

Related U.S. Application Data

(60) Provisional application No. 62/031,713, filed on Jul. 31, 2014.

(51) Int. Cl.
*A01K 5/02* (2006.01)

(52) U.S. Cl.
CPC .................................. *A01K 5/0225* (2013.01)

(58) Field of Classification Search
CPC ...... A01K 5/0225; A01K 39/012; A01K 1/10; A01K 5/00; A01K 5/0107
USPC ........ 119/52.4, 57.91, 57.92, 52.1, 51.01, 53
See application file for complete search history.

(56) References Cited

U.S. PATENT DOCUMENTS

| | | | | |
|---|---|---|---|---|
| 2,667,858 A | * | 2/1954 | Cussotti | A01K 39/012 119/52.1 |
| 4,892,060 A | * | 1/1990 | Lundquist | A01K 39/012 119/52.2 |
| 6,481,374 B1 | * | 11/2002 | Lillig | A01K 5/0225 119/52.1 |
| 8,201,520 B2 | | 6/2012 | Meritt | |
| D681,883 S | * | 5/2013 | Meritt | D30/121 |
| 8,689,737 B2 | * | 4/2014 | Gates | A01K 5/0225 119/53 |
| 2005/0229860 A1 | * | 10/2005 | Meritt | A01K 1/10 119/53 |
| 2006/0048712 A1 | * | 3/2006 | Boyer | A01K 5/0225 119/57.91 |
| 2006/0060148 A1 | * | 3/2006 | Boyer | A01K 5/0225 119/57.91 |
| 2009/0056634 A1 | * | 3/2009 | Bodenstab | A01K 5/0225 119/53 |

* cited by examiner

*Primary Examiner* — Yvonne Abbott-Lewis
(74) *Attorney, Agent, or Firm* — Gardere Wynne Sewell LLP

(57) ABSTRACT

An apparatus is provided for protecting wildlife feed. The apparatus has a body with a bottom portion and a top portion. The body is configured to attach to a feed accumulation portion of a wildlife feeder that provides feed accessible to wildlife. The apparatus further includes a first extension member angularly extending forward from the bottom portion of the body, and a second extension member angularly extending rearward from the top portion of the body.

20 Claims, 3 Drawing Sheets

APPARATUS FOR PROTECTING FEED ACCUMULATED IN A WILDLIFE FEEDER

PRIORITY CLAIM

This application claims priority to U.S. Provisional Application for Patent Ser. No. 62/031,713, filed on Jul. 31, 2014, and entitled "Apparatus for Protecting Wildlife Feed," the disclosure of which is hereby incorporated by reference.

TECHNICAL FIELD

This disclosure relates to apparatuses for protecting wildlife feed or other material, and more particularly to apparatuses for protecting unattended wildlife feed that has accumulated in a wildlife feeder.

BACKGROUND OF THE DISCLOSURE

Wildlife feeders are typically placed in unattended locations for extended periods. The food and material placed in the feeders are often times expensive, and, as previously mentioned, these feeders are often left unattended for extended periods of time. Some such feeders are directed toward larger wildlife such as deer, elk, and other large game animals. While there are apparatuses that control the flow and quantity of feed and other materials that are dispensed, undesirable animals are still able to access the feed. One, non-limiting example of an undesirable animal is a raccoon. Raccoons, for example, are undesirable because (i) they are not the target animal, and (ii) they are generally very wasteful of the feed, digging through the feed and causing the feed to fall to the ground and be subject to the environment, which therein can ruin the feed. There is a continuing need for improvements in apparatuses that prevent undesirable animals from accessing the feed dispensed by these wildlife feeders.

SUMMARY

In a first aspect, there is provided an apparatus for protecting wildlife feed with a body, having a bottom portion and a top portion, extending along an axis. The body is configured to attach to a feed accumulation portion of a wildlife feeder that provides feed accessible to wildlife. The apparatus further includes a first extension member angularly extending forward from the bottom portion of the body, and a second extension member angularly extending rearward from the top portion of the body.

In a second aspect, there is provided an animal feed storage and dispensing system that includes a hopper adapted to store feed and a support structure supporting the hopper. A feed dispensing tube is coupled to the hopper and has an angled portion and a feed accumulation portion. The angled portion extends horizontally and downward from the hopper to permit a flow of feed from the hopper into the feed accumulation portion. The feed accumulation portion defines an opening that is configured to receive at least a portion of a muzzle of a target animal. A first extension member extends from a bottom portion of the feed accumulation portion at an angle away from the angled portion of the feed dispensing tube, and a second extension member extends from the top portion of the feed accumulation portion at an angle toward the angled portion of the feed dispensing tube.

The apparatus for protecting feed that has accumulated in a feed dispensing portion of a gravity flow extended tube feeder according to embodiments of the disclosure provides an obstacle that prevents unwanted animals, such as raccoons, from getting to the feed that is intended for a target game animal. While the apparatus presents an obstacle to the unwanted animal, it does not hinder the target animal's ability or desire to feed from the feeder.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION

Figure 1:
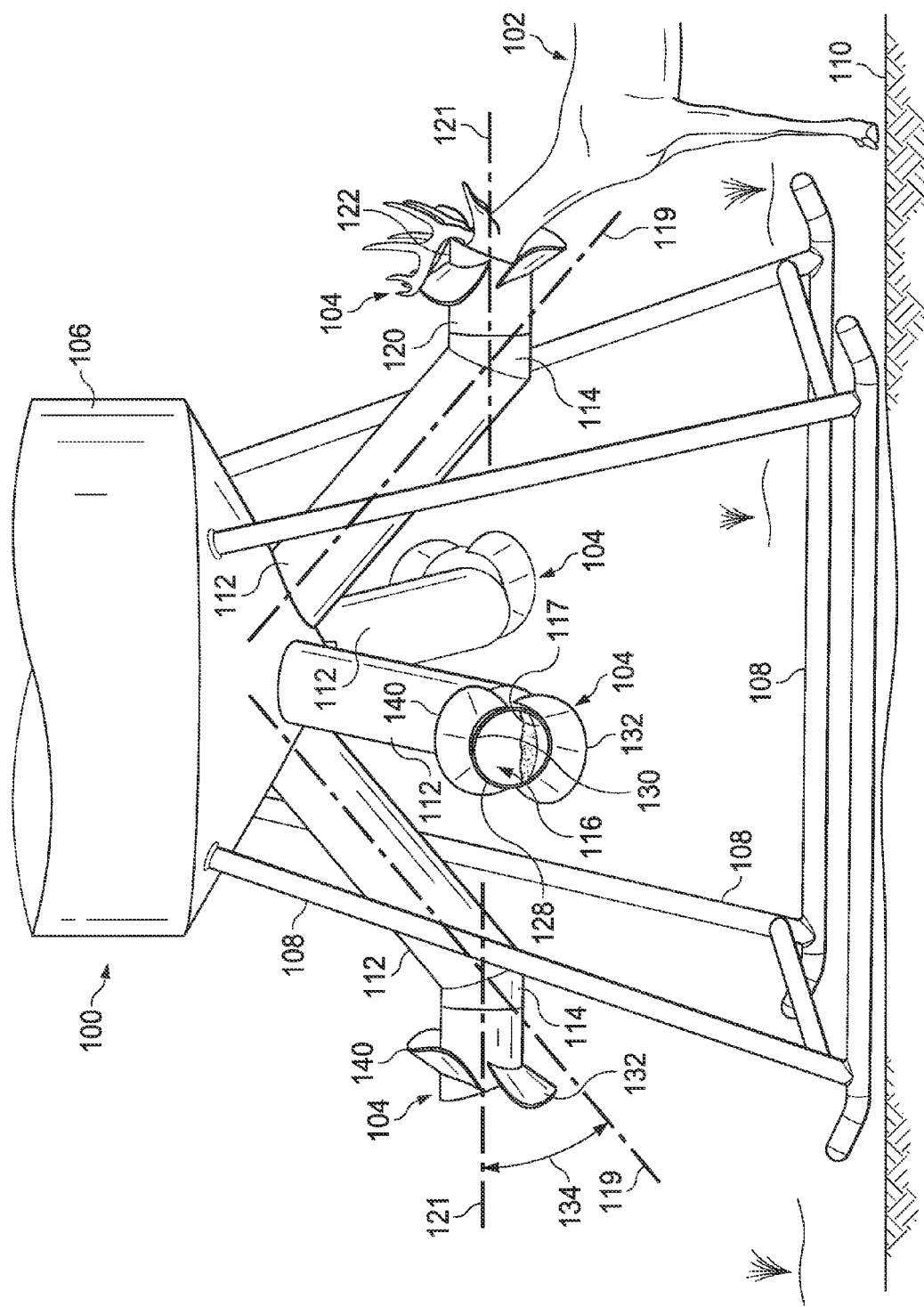
FIG. 1 is a perspective view of a wildlife feeding system with an apparatus for protecting the wildlife feed.

FIG. 1 illustrates an exemplary embodiment of a wildlife feeding system 100 and an animal 102, such as a deer, feeding from the wildlife feeding system 100. Wildlife feeding systems, such as the wildlife feeding system 100 illustrated, are often positioned in remote locations, filled with feed to attract a desired type of animal, and left unattended for extended periods of time. The wildlife feeding system 100 may be found on a farm or ranch and the like where an individual desires to provide feed to wildlife to maintain their health and ensure that young wildlife matures. The wildlife feeding systems 100 is exposed to the elements and various types of wildlife, including the target animal and other undesirable animals that may be attracted to the feed. Certain embodiments of the wildlife feeding system 100 are formed from welding strong metal, such as steel, to form the features shown and described. Materials, such as plastic may also be used to form one or more of the features of the wildlife feeding system 100, but it has been found that systems formed of that heavy duty steel provide a rugged wildlife feeding system 100 that will be durable for long periods, even when subjected to harsh weather conditions.

An extended tube wildlife feeding system employing gravity to cause the feed to flow from a hopper and accumulate in a feeder tube to be consumed by a hoofed game animal is described in U.S. Pat. No. 8,201,520, the content of which is herein incorporated by reference. The wildlife feeding system 100 is generally targeted, in one embodiment, toward game animals such as deer, elk, moose, and other types of game animals.

The wildlife feeding system 100 is generally designed to control the flow and quantity of feed and other materials that are dispensed, and to ensure that consumed feed is replenished in an accessible tube where it is protected from environmental conditions but attracts and may be consumed by game animals. The wildlife feeding system 100 includes features to prevent or at least minimize undesirable animals from accessing the feed that has accumulated in a feed tube and is intended to be consumed by the target animals.

Undesirable animals, such as raccoons and the like, will consume the feed that is intended for the target animals. Because these systems 100 may be left unattended for long periods of time, it may be unknown by the farmer or rancher that the food is not available for the target animals because it has been consumed by the undesirable animals. An apparatus 104 prevents undesirable animals from reaching the accumulated feed, yet still provides an inviting and non-threatening environment that attracts the target animals and allows them to easily consume the feed that accumulates in the extended tubes.

The system 100 includes a feed storage and dispensing hopper 106 adapted to store feed, a portion of which is shown in FIG. 1. A support structure 108 supports the hopper 106 at an elevation above ground level 110 and maintains a plurality of feed dispensing tubes 112 at an elevation below the hopper 106 and maintains a feed accumulation portion or tube 114 at approximately a muzzle height of a standing mature hoofed animal. The plurality of feed dispensing tubes 112 are coupled such that each tube 112 receives feed from a bottom portion of the hopper 106. For example, each tube 112 may intersect the bottom portion of the hopper 106 at respective openings (not shown) in the hopper 106 to permit the flow of feed from the hopper 106 into the feed dispensing tubes 112. The flow of feed from the hopper 106 into the feed dispensing tubes 112 is caused by gravity. As shown, the feed dispensing tubes 112 may extend radially outward and downward at an angle along a tube axis 119. Each of the feed dispensing tubes 112 has a feed accumulation portion 114. The feed accumulation portion 114 is generally tube-shaped with an axis 121 that is substantially parallel to horizontal. The feed accumulation portion 114 defines an opening 116 at a distal end of the feed accumulation portion 114. The opening 116 is configured to allow a muzzle of an animal to be inserted into the opening 116 to access the accumulated feed and also protect the feed from the elements and from falling to the ground 110. As illustrated, the feed accumulation portion 114 may be horizontal, and, thus, the axis 121 may be substantially horizontal and form an angle 134 relative to the tube axis 119. The angle between the feed accumulation portion axis 121 and the feed dispensing tube axis 119 may be in the range of 40-50 degrees. In one embodiment, the angle 134 is approximately 45 degrees.

In one aspect, the feed accumulation portion 114 includes an interior surface where the feed is allowed to accumulate. According to certain embodiments, a retaining member 117, such as a lip, extends vertically upward from the bottom of the feed accumulation portion 114 and blocks a lower portion of the opening 116 to prevent the feed from flowing out of the opening 116 and onto the ground 110. The retaining member 117 only blocks part of the opening 116 such that the opening 116 is still large enough to receive of the muzzle of an animal so it is able to consume the accumulated feed.

Figure 2:
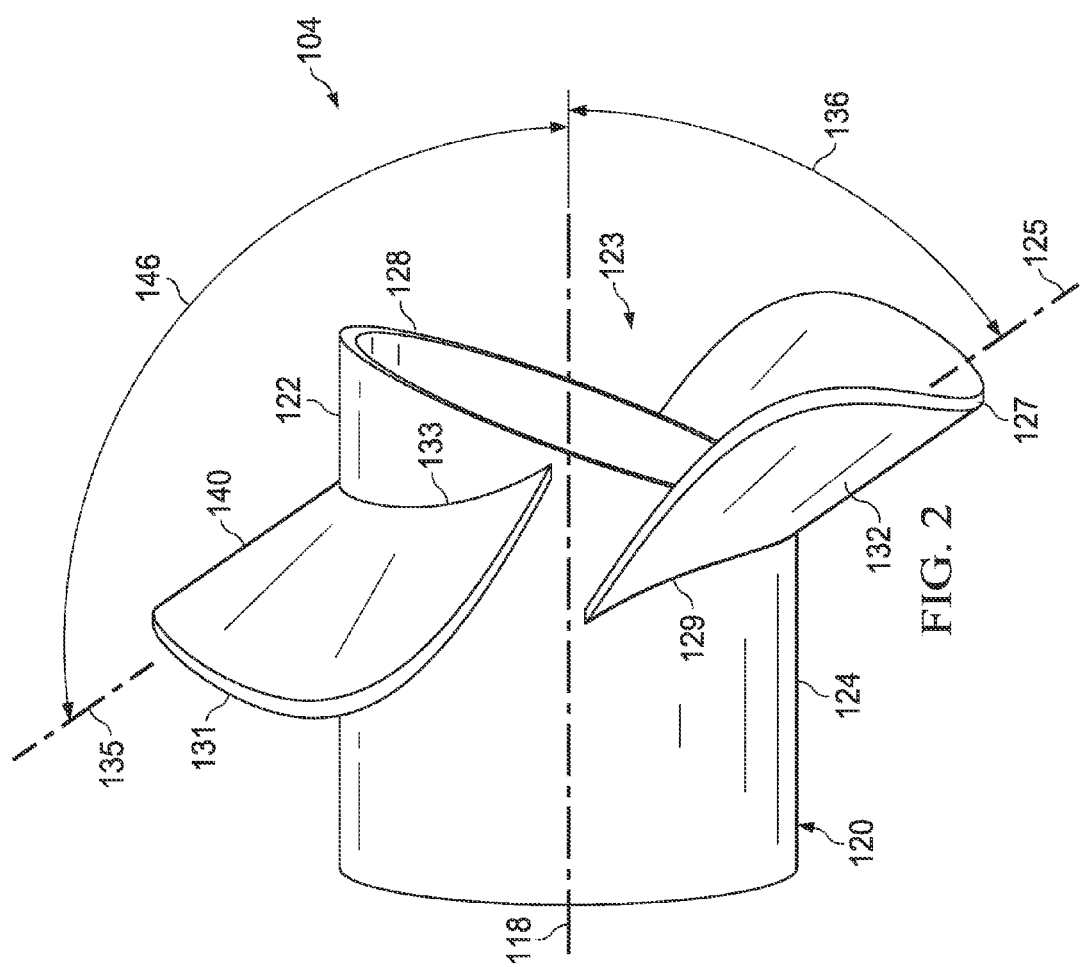
FIG. 2 is a perspective view of an apparatus for protecting the wildlife feed for use in a wildlife feeding system, such as the wildlife feeding system illustrated in FIG. 1.
Figure 3:
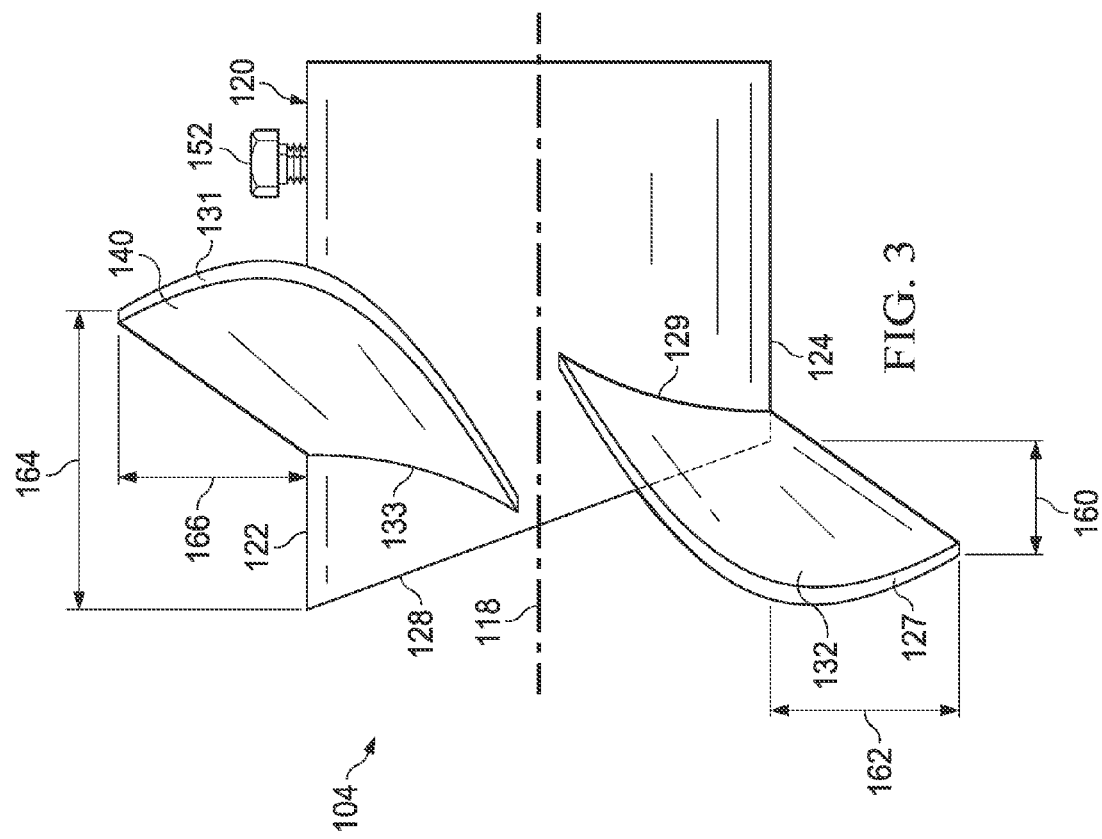
FIG. 3 is a side view of the apparatus for protecting the wildlife feed illustrated in FIG. 2.

The system further includes the apparatus 104 for preventing unwanted animals from accessing the feed that has accumulated in the feed accumulation portion 114. Referring now primarily to FIGS. 2 and 3, but with continued reference to FIG. 1, the apparatus 104 for protecting wildlife feed from undesirable animals is discussed in more detail. The apparatus 104 includes a body 120 extending along a body axis 118. The body axis 118 may be substantially horizontal and collinear with the axis 121 when installed on the feed accumulation portion 114.

In one, non-limiting embodiment, the body 120 has a cylindrical shape and defines an opening 123, which corresponds to the opening 116 with the apparatus 104 positioned on the feed accumulation portion 114. The body 120, however, may be formed in a variety of shapes to include, but in no means to be construed as limiting, a square, rectangle, or oval. The body 120 should be formed in a shape that is unobtrusive to the target animal's 102 ability to feed from the system 100. In other words, the shape of the body 120 should not scare or prohibit the animal 102 from reaching the accumulated feed.

The body 120 includes an upper or top portion 122 and a lower or bottom portion 124. A first or downward extension member or appendage 132 extends radially from the lower portion 124 of the body 120. The extension member 132 also extends axially forward of the body 120. A centerline 125 of the extension member 132 forms and angle 136 relative to the body axis 118, and therefore relative to the axis 121 of the feed accumulation portion 114 when the body 120 has been positioned on the feed accumulation portion 114, as shown in FIG. 1. The angle 136 is in the range of 30-60 degrees, for example the angle 136 may be 45 degrees. In one aspect, the angle 136 is similar to the angle 134 between the feed accumulation portion axis 121 and the feed tube axis 119.

The extension member 132 includes a convex edge 127 and an opposite concave edge 129. The concave edge 129 corresponds to the curvature of the body portion 120. Thus, the concave edge 129 fits over the body portion 120 where it can be welded at the angle 136 shown. The lower extension 132 is bent to have a curvature about the centerline 125.

The angle 136 facilitates the target animal's 102 ability to reach the feed because the extension member 132 does not block any of the openings 123, 116 and in fact visually makes the openings 116, 123 appear larger and more inviting to the target animal 102. The extension member 132 blocks the lower part of the opening from being grasped by an undesirable animal. Rather, in attempting to reach the feed from below the feed accumulation portion 114, the undesirable animal will be forced to attempt to grasp the extension member 132, but it will be unsuccessful because the flat curved plate of the extension member 132 does not provide a feature for the undesirable animal to grip, and therefore it will slide off the extension member 132 and be unable to access the feed in the feed accumulation portion 114. In one aspect, the downward extension member 132 includes a coating (not shown) to reduce the coefficient of friction of the downward extension member 132 to make it more difficult for an unwanted animal to maintain a grip on the downward extension member 132.

A second or upward extension member 140 extends radially from the body 120. The second extension member 140 extends upward from the upper portion 122 of the body 120. The extension member 140 also extends axially rearward with respect to the body 120 and toward the feed dispensing tube 112. A centerline 135 of the extension member 140 forms an angle 146 relative to the body axis 118, and therefore relative to the axis 121 of the feed accumulation portion 114 when the apparatus 104 is positioned on the feed accumulation portion 114, as shown in FIG. 1. The angle 146 is in the range of 100-160 degrees. For example, the angle 146 may be approximately 135 degrees. In one aspect, the upper extension member 140 extends radially and axially approximately 180 degrees opposite the extension of lower extension member 132.

Similar to the lower extension member 132, the upper extension member 140 includes a convex edge 131 and an opposite concave edge 133. The concave edge 133 corresponds to the curvature of the body portion 120. Thus, the concave edge 133 fits over the body portion 120 where it can be welded or otherwise secured to the body 120 at the angle 146. The upper extension 140 is bent to have a curvature about the centerline 135.

The angle 146 facilitates the target animal's 102 ability to reach the feed because the extension member 140 does not block any of the openings 116, 123, and in fact extends away from the openings 116, 123 to provide more visibility to a feeding animal 102 and also to accommodate antlers of a mature feeding animal.

In attempting to reach the feed from by crawling along a top surface of the feed accumulation portion 114, the undesirable animal will encounter upper extension member 140, which blocks the animal from reaching the openings 116, 123. Moreover, the flat curved plate of extension member 140 does not provide a feature for the undesirable animal to grasp, and therefore it will likely not be able to maintain a hold of the extension member 140.

For example, the upper extension member 140 may function to prohibit an unwanted animal that has gained access to the feeding accumulation portion 114, from sliding down the feeding tube 112 and on to the feed accumulation portion 114 to gain entry into openings 116, 123 by crawling along the top surface of the feed accumulation portion 114.

In one embodiment, the upward extension member 140 includes a coating (not shown) to reduce the coefficient of friction of the upward extension member 140 to make it more difficult for an unwanted animal to maintain a grip on the upward extension member 140.

Referring to FIG. 3, which is a side elevation view of the apparatus 104 illustrating certain dimensions. The following dimensions have been found to sufficiently deter and prevent undesirable animals, such as raccoons, from accessing the feed that has accumulated in feed accumulation portion 114. According to one embodiment, the lower extension member 132 extends axially a dimension 160 and radially a dimension 162 from the lower part of the opening 123. The radial dimension 162 is in the range of 2-5 inches, for example 3.5 inches, and the axial dimension 160 is in the range 2-5 inches, for example 3 inches. The upper extension 140 extends axially rearward an axial dimension 164 from an upper part of the opening 123 and extends radially a radial dimension 166 from the upper part of the opening. The axial dimension 164 is in the range 4-7 inches, for example 5.75 inches, and the radial dimension 166 is in the range 2-5 inches, for example 3.5 inches. It should be understood that, unless otherwise specified by particular claim language, the claimed invention is not limited to the dimensions provided, but rather any suitable dimensions are contemplated by the present disclosure.

The upper and lower extension members 140, 132 may be formed in a number of shapes to provide an obstacle to the openings 116, 123 and prevent unwanted animals from maintaining a grip (or foothold) to prevent the unwanted animal from accessing the feed accumulated in feed accumulation portion 114. In one aspect, the upper and lower extension members 140, 132 are rounded or rolled in a circular manner such that the upper and lower extension members 140, 132 maintain the same or substantially similar angle relative to one of the identified axis along all points of the extension member. In another aspect, the upper and lower extension members 140, 132 may have an elliptical or parabolic shape such that every point on the extension members is not necessarily the same with reference to one of the identified axes. In yet another embodiment, the upper and lower extension members 140, 132 are rolled with a cone shape.

The body 120 is configured to be slideably positioned adjacent to and in contact with the feed accumulation portion 114. In one embodiment, the body 120 is slideably positioned around an outer surface 126 of the feed accumulation portion 114. In one non-limiting embodiment, the body 120 has a first edge 128 configured to be flush with a first edge 130 of the feed accumulation portion 114 when the body 120 is positioned around the feed accumulation portion 114. In another embodiment, the first edge 128 of the body 120 does not have to be flush or aligned with the first edge 130 of the feed accumulation portion 114.

In operation, the apparatus 104 may be positioned on an existing system out in the field. The apparatus 104 may be attached to the system 100 by welding, fasteners, interference fit, or other type of attachment mechanism known in the art. A combination of attachment mechanisms may be used. The apparatus may include one or more apertures formed in the body 120 for receiving respective fastener such as a set screw 152. In one embodiment, a single set screw 152 is received through the upper portion 122 of the body 120. The set screw 152 may be at least partially covered by the upper extension member 140. It may be desirable for the fastener, for example the set screw 152, to have a low profile to prevent or inhibit an unwanted animal from using the fastener as a means to crawl onto the feed accumulation portion 114.

In another embodiment (not shown), the apparatus 104 may be welded to the feed accumulation portion 114 such that there is a slight extension of the feed accumulation portion 114, but the feed will still accumulate where it can be consumed by the target animal 102. In yet another embodiment (not shown), the apparatus 104 may consist of an upper and lower extension member 132, 140 attached directly to the feed accumulation portion 114 without the body 120 acting as an intermediary. The upper and lower extension members 140, 132 may be welded directly to the feed accumulation portion 114 and have the same or similar properties as described above with respect to upper and lower extension members 140, 132.

As described above, in the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. As stated above, terms such as "top", "bottom", "above", "below", "upward" and "downward" and the like are used as words of convenience to provide reference points and are not to be construed as limiting terms.

In this specification, any use of the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention(s) are not to be limited to the disclosed embodiments, but on the contrary, are intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. An apparatus for protecting wildlife feed in a feed accumulation portion of an extended tube feeder, the apparatus comprising:
    a body defining a longitudinal axis, a first opening at a first end, and a second opening at a second end opposite the first end, the first opening configured to receive at least part of a muzzle of a target animal;
    a first extension member angularly extending from a bottom portion of the body away from the second opening; and
    a second extension member angularly extending from a top portion of the body toward the second opening.

2. The apparatus of claim 1, wherein the first extension member is curved about a centerline of the first extension member.

3. The apparatus of claim 1, wherein the second extension member is curved about a centerline of the second extension member.

4. The apparatus of claim 1, wherein the first extension member extends beyond at least a portion of a front edge of the body.

5. The apparatus of claim 1, wherein the body is cylindrical.

6. The apparatus of claim 1 further comprising a set screw received through the top portion of the body.

7. The apparatus of claim 1 wherein a centerline of the first extension member forms an angle relative to the longitudinal axis of 30-60 degrees.

8. The apparatus of claim 1 wherein a centerline of the second extension member forms an angle relative to the longitudinal axis of 100-160 degrees.

9. The apparatus of claim 1 wherein a concave edge of the first extension member is welded to the body.

10. The apparatus of claim 9 wherein a concave edge of the second extension member is welded to the body.

11. An animal feed storage and dispensing system, comprising:
    a hopper adapted to store feed;
    a support structure supporting the hopper;
    a feed dispensing tube coupled to the hopper and having an angled portion and a feed accumulation portion, the angled portion extending horizontally and downward from the hopper to permit a flow of feed from the hopper into the feed accumulation portion, the feed accumulation portion defining an opening configured to receive at least a portion of a muzzle of a target animal; and
    a first extension member extending from a bottom portion of the feed accumulation portion at an angle away from the angled portion of the feed dispensing tube; and
    a second extension member extending from a top portion of the feed accumulation portion at an angle toward the angled portion of the feed dispensing tube.

12. The system of claim 11, wherein the first extension member is curved about a centerline of the first extension member, and the second extension member is curved about a centerline of the second extension member.

13. The system of claim 11, wherein the first extension member extends beyond at least a portion of a front edge of the feed accumulation portion.

14. The system of claim 11, wherein the feed accumulation portion is cylindrical.

15. The system of claim 11 wherein the feed accumulation portion defines a longitudinal axis, a centerline of the first extension member forming an angle relative to the longitudinal axis of 30-60 degrees, and a centerline of the second extension member forming an angle relative to the longitudinal axis of 100-160 degrees.

16. The system of claim 11 wherein a concave edge of the first extension member is welded to the feed accumulation portion, and a concave edge of the second extension member is welded to the feed accumulation portion.

17. An animal feed storage and dispensing system, comprising:
    a hopper adapted to store feed;
    a support structure supporting the hopper;
    a feed dispensing tube coupled to the hopper and having an angled portion and a feed accumulation portion, the angled portion extending horizontally and downward from the hopper to permit a flow of feed from the hopper into the feed accumulation portion, the feed accumulation portion defining an opening configured to receive at least a portion of a muzzle of a target animal; and
    a cylindrical body coupled to the feed accumulation portion;
    a first extension member extending from a bottom portion of the cylindrical body at an angle away from the angled portion of the feed dispensing tube; and
    a second extension member extending from a top portion of the cylindrical body at an angle toward the angled portion of the feed dispensing tube.

18. The system of claim 17 wherein the feed accumulation portion defines a longitudinal axis, a centerline of the first extension member forming an angle relative to the longitudinal axis of 30-60 degrees, and a centerline of the second extension member forming an angle relative to the longitudinal axis of 100-160 degrees.

19. The system of claim 17 wherein a concave edge of the first extension member is welded to the body, and a concave edge of the second extension member is welded to the body.

20. The system of claim 17 further comprising a set screw received through the body to secure the body to the feed accumulation portion.

* * * * *